(12) United States Patent
Eilan et al.

(10) Patent No.: US 11,982,286 B2
(45) Date of Patent: May 14, 2024

(54) WELL PUMPING APPARATUS AND METHODS

(71) Applicant: ORMAT TECHNOLOGIES, INC., Reno, NV (US)

(72) Inventors: Benjamin Eilan, Tel Aviv (IL); Boris Polyak, Ashkelon (IL); Nadav Darf, Rishon LeZion (IL); Alex Katz, Yavne (IL); Oren Ram, Yavne (IL)

(73) Assignee: Ormat Technologies, Inc., Reno, NV (US)

( * ) Notice: Subject to any disclaimer, the term of this patent is extended or adjusted under 35 U.S.C. 154(b) by 0 days.

(21) Appl. No.: 18/287,497

(22) PCT Filed: Apr. 12, 2022

(86) PCT No.: PCT/IL2022/050380
§ 371 (c)(1),
(2) Date: Oct. 19, 2023

(87) PCT Pub. No.: WO2022/224239
PCT Pub. Date: Oct. 27, 2022

(65) Prior Publication Data
US 2024/0093694 A1    Mar. 21, 2024

(30) Foreign Application Priority Data
Apr. 20, 2021 (IL) .......................................... 282457

(51) Int. Cl.
F04D 29/06    (2006.01)
F04D 13/10    (2006.01)
F04D 29/046   (2006.01)

(52) U.S. Cl.
CPC ........... *F04D 29/061* (2013.01); *F04D 13/10* (2013.01); *F04D 29/046* (2013.01); *F05D 2230/64* (2013.01)

(58) Field of Classification Search
CPC ...... E21B 43/121; E21B 43/126; F04D 13/10; F04D 29/061; F04D 29/046
See application file for complete search history.

(56) References Cited

U.S. PATENT DOCUMENTS 2,178,822 A * 11/1939 Barnett .................. F04B 47/00
                                                       92/153
8,113,765 B2   2/2012 Sullivan
(Continued)

FOREIGN PATENT DOCUMENTS

| CA | 2258237 A1 * | 7/2000 | ............. F04B 47/08 |
| EP | 2464820 B1 | 9/2017 | |

OTHER PUBLICATIONS

Brochure B-100, Peerless Pump, Vertical Lineshaft Turbine Pumps, undated, 13 pages.
(Continued)

*Primary Examiner* — J. Todd Newton
*Assistant Examiner* — Jackson N Gillenwaters
(74) *Attorney, Agent, or Firm* — Fenwick & West LLP

(57) ABSTRACT

A well pumping apparatus including a discharge head (110), a drive string rod (130) in fluid communication with an inner cavity (142) of a production tubing (140), a pre-lubrication port (160) at the discharge head, and lubrication cups (134) installed along the drive string rod adjacent to sets of bearings (150) distributed along the drive string rod.

13 Claims, 6 Drawing Sheets

(56) References Cited

U.S. PATENT DOCUMENTS

| | | |
|---|---|---|
| 8,336,632 B2 | 12/2012 | Morrow et al. |
| 9,470,075 B2 | 10/2016 | Morrow |
| 2009/0169358 A1 | 7/2009 | Sullivan |
| 2013/0112431 A1 | 5/2013 | Morrow et al. |
| 2014/0072416 A1 | 3/2014 | Amir |
| 2014/0199159 A1 | 7/2014 | Klain et al. |
| 2014/0311730 A1* | 10/2014 | Morrow ............... F04C 2/1071 166/68.5 |

OTHER PUBLICATIONS

PCT International Search Report and Written Opinion, PCT Application No. PCT/IL2022/050380, dated Aug. 24, 2022, 12 pages.

* cited by examiner

WELL PUMPING APPARATUS AND METHODS

RELATED APPLICATIONS

This PCT application claims priority from Israeli application IL 282457 filed on 20 Apr. 2021 and having the same title as the present application, which is fully incorporated herein by reference.

FIELD OF THE INVENTION

The invention is in the field of geothermal liquid supply systems.

BACKGROUND OF THE INVENTION

Downhole geothermal production pumps lift geothermal brine from within a well or column to the ground surface. The geothermal brine is pumped at a high temperature and pressure, e.g. a temperature on the order of 350° F. and a pressure on the order of 300 psi which is greater than its flash point, in order to ensure continual geothermal brine flow throughout the geothermal system and also prevent scale precipitation. The geothermal brine is not a clean fluid and has many suspended particles and abrasives in it.

Due to the harsh conditions imposed by geothermal brine, considerable pump bearing wear is expected. Petroleum oil is often used as a lubricant. Petroleum oil can prevent excessive wear to bearings mounted on the main pump shaft. However, the drive shaft and bearings of geothermal production pumps are prone to fail as a result of intrusion of the geothermal fluid. Bearing failure can also be caused by the precipitation of scale thereon.

Geothermal brine is typically a concentrated saline solution that has circulated through rocks and become enriched in substances leached from those rocks (e.g. chlorides of Na, K, and Ca). The brine often contains dissolved metals (e.g. Cu, Pb, Zn, and Ag).

SUMMARY OF THE INVENTION

A broad aspect of the invention relates to use of geothermal brine for lubrication of line shaft bearings.

One aspect of some embodiments of the invention relates to pre-lubrication ports provided in the discharge head adjacent to a drive string rod. In some embodiments the pre-lubrication ports are open at the bottom so that lubrication fluid placed in the port flows downwards along an outer surface of the drive string rod. In some exemplary embodiments of the invention, oil is placed in the pre-lubrication ports.

Another aspect of some embodiments of the invention relates to lubrication cups installed adjacent to each set of bearings along the drive string rod. In some exemplary embodiments of the invention, the bearings are non-metallic bearings. In some embodiments the lubrication fluid from the pre-lubrication ports gathers in the cups. In some embodiments the lubrication cups overflow so that lubrication fluid placed in the cups flows downwards along an outer surface of the pump shaft.

A further aspect of some embodiments of the invention relates to pre-lubrication of bearings along a pump shaft using oil followed by lubrication with brine from a geothermal well.

Still another aspect of some embodiments of the invention relates to a lubricant sensor installed below a bottom-most lubrication cup. In some embodiments an output signal from the sensor informs a motor controller that the system is loaded with lubricant and pump operation can begin.

Yet another aspect of some embodiments of the invention relates to use of nonmetallic bearings along the drive string rod. In some embodiments the bearings include reinforced fluoropolymer. One example of a reinforced fluoropolymer is Aramid reinforced Polytetrafluoroethylene (PTFE). Common Examples of Aramid (aromatic polyamide) include KEVLAR and TWARON.

According to various exemplary embodiments of the invention two, three or four or more aspects, with one or more features from each, are combined in a single embodiment.

It will be appreciated that the various aspects described above relate to solution of technical problems associated with reducing oil contamination in brine harvested from a geothermal well and/or processing issues associated with removing such oil.

Alternatively or additionally, it will be appreciated that the various aspects described above relate to solution of technical problems related to reduction of wear of bearings distributed along the length of a pump shaft in a geothermal well which do not receive continuous lubrication via an enclosed sleeve.

In some exemplary embodiments of the invention there is provided a well pumping apparatus including: (a) a discharge head (110); (b) a drive string rod (130) in fluid communication with an inner cavity (142) of a production tubing (140); (c) a pre-lubrication port (160) at the discharge head; and (d) lubrication cups (134) installed along the drive string rod adjacent to sets of bearings (150) distributed along the drive string rod. In some embodiments the well pumping apparatus includes drive string rod couplings (132) between sections of the drive string rod. Alternatively or additionally, in some embodiments the well pumping apparatus includes production tubing couplings (144) with bearing supports (152) between sections of the production tubing. Alternatively or additionally, in some embodiments the bearings include non-metallic bearings. Alternatively or additionally, in some embodiments the non-metallic bearings include fluoropolymer. Alternatively or additionally, in some embodiments the fluoropolymer is reinforced. Alternatively or additionally, in some embodiments the well pumping apparatus includes a lubricant sensor (111) installed at or below a bottom-most unsubmerged lubrication cup, the sensor providing an output signal (113) when in contact with lubricant. Alternatively or additionally, in some embodiments the well pumping apparatus includes a controller (105) which operates a motor (103) to turn the drive string rod in response to the output signal from the sensor.

In some exemplary embodiments of the invention there is provided a method including: (a) pouring (210) sufficient lubricant into a lubrication port of a well pumping apparatus to fill a series of lubrication cups installed along a drive string rod of the apparatus; (b) ceasing (220) the pouring and activating (230) a motor which rotates the drive string rod; and (c) relying (240) on brine rising in a production tubing of the well pumping apparatus for continued lubrication. In some embodiments the lubricant includes an edible oil. Alternatively or additionally, in some embodiments the ceasing is in response to a signal from a lubricant sensor (111) installed at or below a bottom-most unsubmerged lubrication cup. Alternatively or additionally, in some embodiments the ceasing occurs after pouring continues for a predetermined time. Alternatively or additionally, in some embodiments the ceasing occurs after pouring continues for a predetermined volume of lubricant.

In some exemplary embodiments of the invention there is provided a method including: (a) applying (310) a non-aqueous lubricant to bearings installed along a drive string rod of a well pumping apparatus while the drive string is not rotating; (b) activating (320) a motor which rotates the drive string rod; and (c) relying (330) on a flow of material rising in a production tubing of the well pumping apparatus for continued lubrication of the bearings. In some embodiments the material rising in the production tubing includes water. Alternatively or additionally, in some embodiments the material rising in the production tubing includes geothermal brine. Alternatively or additionally, in some embodiments the non-aqueous lubricant includes an edible oil. Alternatively or additionally, in some embodiments the bearings include fluoropolymer. Alternatively or additionally, in some embodiments the fluoropolymer is reinforced.

In some exemplary embodiments of the invention there is provided a well pumping apparatus including: (a) a discharge head (110); (b) a drive string rod (130) in fluid communication with an inner cavity (142) of a production tubing (140); and (c) sets of bearings (150) including fluoropolymer distributed along a length of the drive string rod. In some embodiments the fluoropolymer is reinforced. Alternatively or additionally, in some embodiments the fluoropolymer is reinforced with aramid. Alternatively or additionally, in some embodiments the well pumping apparatus includes a pre-lubrication port (160) at the discharge head; and lubrication cups (134) installed along the drive string rod adjacent to the sets of bearings. Alternatively or additionally, in some embodiments the well pumping apparatus includes drive string rod couplings (132) between sections of the drive string rod. Alternatively or additionally, in some embodiments the well pumping apparatus includes production tubing couplings (144) with bearing supports (152) between sections of the production tubing. Alternatively or additionally, in some embodiments the well pumping apparatus includes a lubricant sensor (111) installed at or below a bottom-most lubrication cup, the sensor providing an output signal (113) when in contact with lubricant. Alternatively or additionally, in some embodiments the well pumping apparatus includes a controller (105) which operates a motor (103) to turn the drive string rod in response to the output signal from the sensor.

Unless otherwise defined, all technical and scientific terms used herein have the same meaning as commonly understood by one of ordinary skill in the art to which this invention belongs. Although suitable methods and materials are described below, methods and materials similar or equivalent to those described herein can be used in the practice of the present invention. In case of conflict, the patent specification, including definitions, will control. All materials, methods, and examples are illustrative only and are not intended to be limiting.

As used herein, the terms "comprising" and "including" or grammatical variants thereof are to be taken as specifying inclusion of the stated features, integers, actions or components without precluding the addition of one or more additional features, integers, actions, components or groups thereof. This term is broader than, and includes the terms "consisting of" and "consisting essentially of" as defined by the Manual of Patent Examination Procedure of the United States Patent and Trademark Office. Thus, any recitation that an embodiment "includes" or "comprises" a feature is a specific statement that sub embodiments "consist essentially of" and/or "consist of" the recited feature.

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

The phrase "adapted to" as used in this specification and the accompanying claims imposes additional structural limitations on a previously recited component.

The term "method" refers to manners, means, techniques and procedures for accomplishing a given task including, but not limited to, those manners, means, techniques and procedures either known to, or readily developed from known manners, means, techniques and procedures by practitioners of architecture and/or computer science.

BRIEF DESCRIPTION OF THE DRAWINGS

In order to understand the invention and to see how it may be carried out in practice, embodiments will now be described, by way of non-limiting example only, with reference to the accompanying figures. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. The attached figures are.

DETAILED DESCRIPTION OF EMBODIMENTS

Embodiments of the invention relate to apparatus and methods for geothermal well pumping.

Specifically, some embodiments of the invention use geothermal brine to lubricate drive string rod bearings during operation of the drive string and a non-aqueous lubricant (e.g. oil) to pre-lubricate the bearings prior to operation of the drive string shaft.

The principles and operation of an apparatus or method according to exemplary embodiments of the invention may be better understood with reference to the drawings and accompanying descriptions.

Before explaining at least one embodiment of the invention in detail, it is to be understood that the invention is not limited in its application to the details set forth in the following description or exemplified by the Examples. The invention is capable of other embodiments or of being practiced or carried out in various ways. Also, it is to be understood that the phraseology and terminology employed herein is for the purpose of description and should not be regarded as limiting.

Exemplary Pumping Apparatus

Figure 1A:
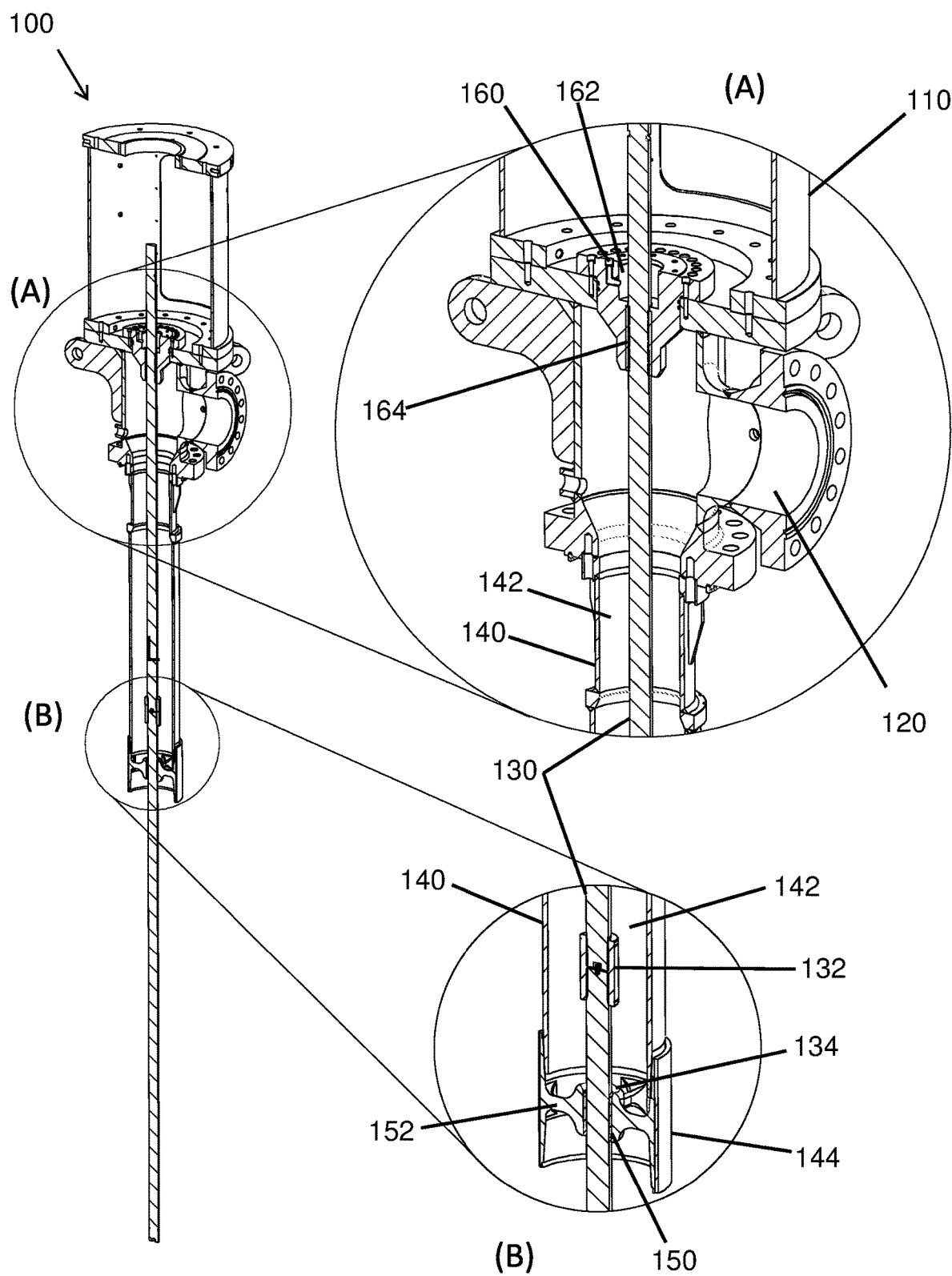
FIG. 1A is an axial cross section of a portion of a pumping apparatus according to some exemplary embodiments of the invention with inset (A) showing an exemplary discharge head in greater detail and inset (B) showing an exemplary bearing assembly in greater detail.

FIG. 1A is an axial cross section of a portion of a pumping apparatus, indicated generally as 100, according to some exemplary embodiments of the invention. Inset (A) shows an exemplary discharge head and motor stand (with motor removed) in greater detail. Inset (B) shows an exemplary bearing assembly in greater detail.

In the depicted embodiment, apparatus 100 includes a discharge head 110 and a drive string rod 130 in fluid communication with an inner cavity 142 of a production tubing 140. In the depicted embodiment, there is no lubrication sleeve encasing drive string rod 130.

Depicted exemplary apparatus 100 includes a pre-lubrication port 160 in discharge head 110. In the depicted embodiment pre-lubrication port 160 is in fluid communication with a temporary reservoir 162 circumferentially surrounding drive string rod 130. In the depicted embodiment, lubricant introduced into temporary reservoir 162 via pre-lubrication port 160 flows downwards through a narrow opening 164 circumferential to drive string rod 130 at a bottom of temporary reservoir 162. As a result, lubrication fluid (e.g. oil) poured into pre-lubrication port 160 is free to flow downwards along an outer surface of drive string rod 130. According to various exemplary embodiments of the invention a magnitude of the difference in diameters between opening 164 and drive string rod 130 and/or a viscosity of the lubrication fluid and/or an ambient temperature each contribute to a rate of this downwards flow of lubrication fluid.

Figure 1B:
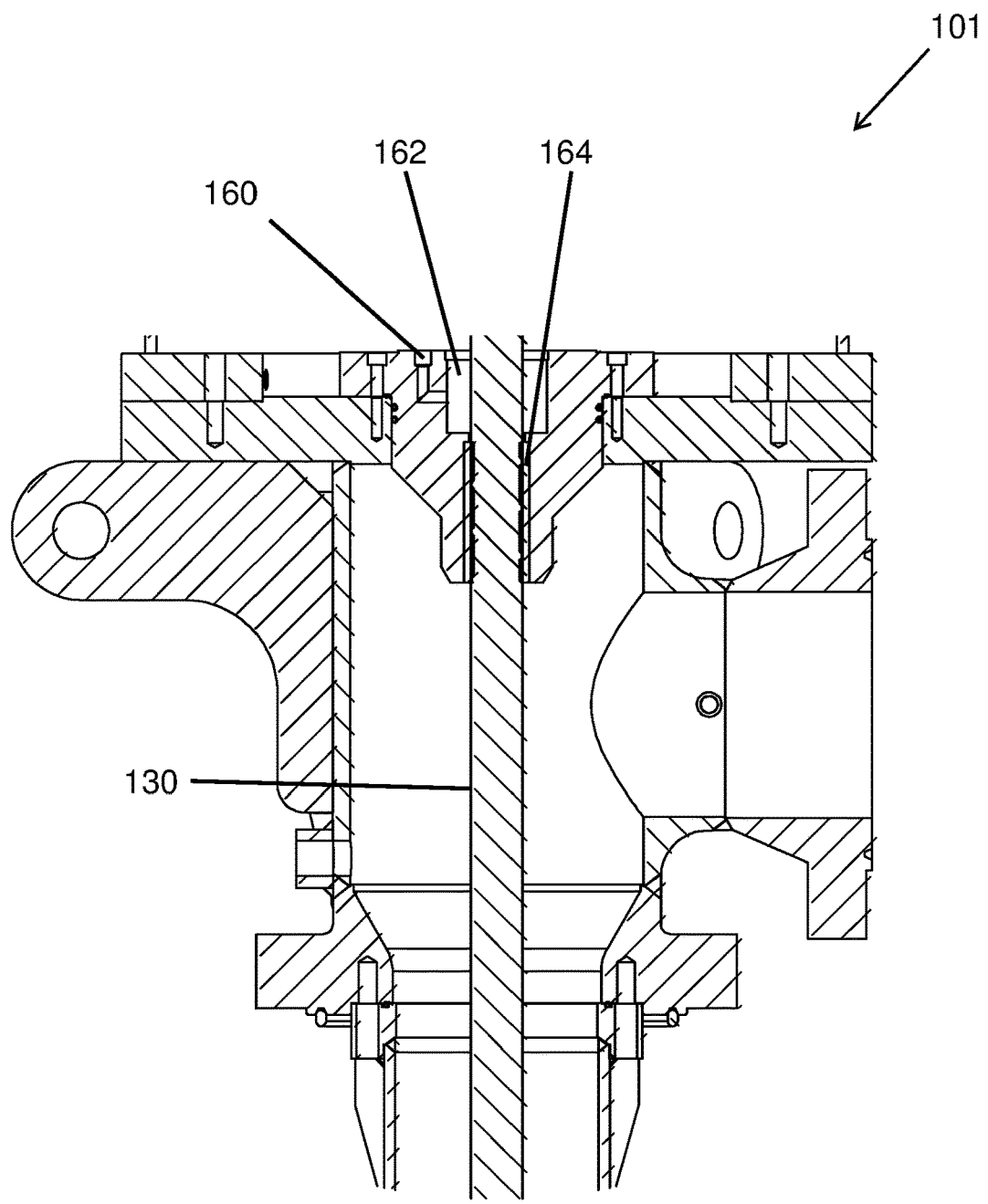
FIG. 1B is an axial cross section of a portion of an exemplary discharge head featuring a pre-lubrication port according to some exemplary embodiments of the invention.

FIG. 1B shows the relationship between parts 160, 162, 164 and 130 more clearly.

Lubrication port 160 (FIG. 1A and FIG. 1B) is part of the discharge head. Port 160 is added to the seal housing and connected via a valve (not depicted) to the oil source. Port 160 is in fluid communication with reservoir 162.

As the lubrication fluid flows downwards from reservoir 162, it fills, in succession, a series of lubrication cups 134 installed along drive string rod 130 adjacent to sets of bearings 150 distributed along the drive string rod.

Figure 1C:
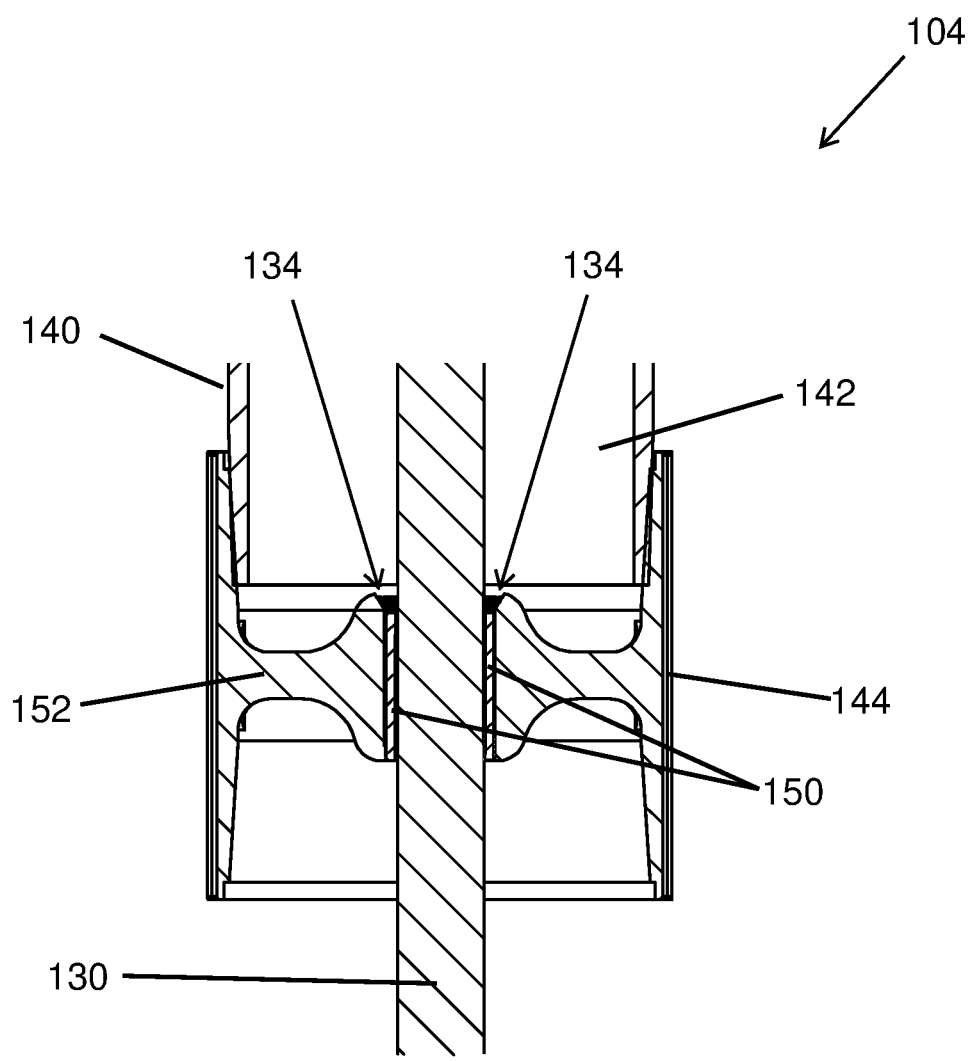
FIG. 1C is an axial cross section of a portion of a line shaft featuring pre-lubrication cups according to some exemplary embodiments of the invention.

FIG. 1C shows that cups 134 are defined by a sloped edge in a top portion of bearing supports 134 (right above bearing 150) and the external vertical surface of drive string rod 130. Cups 134 are in fluid communication with bearings 150. Each cup 134 holds sufficient oil to ensure that the bearing 150 immediately below it remains lubricated.

Referring now to inset B in FIG. 1A: In the depicted embodiment, bearings 150 are stabilized by bearing supports 152. In the depicted embodiment, supports 152 are integrated in production tube couplings 144. In other exemplary embodiments of the invention, (not depicted) supports 152 are provided as separate parts from couplings 144. In the depicted embodiment, sections of drive string rod 130 are joined by drive string rod section couplings 132. In some embodiments this arrangement contributes to ease of assembly of the apparatus 100 on site and/or to an ability to extend drive string rod 130 and/or production tubing 140 as the well becomes deeper. Alternatively or additionally, in some embodiments bearings 150 are provided as non-metallic bearings. In some exemplary embodiments of the invention, the nonmetallic bearings comprise reinforced fluoropolymer. In some embodiments use of reinforced fluoropolymer in bearings contributes to an ability to withstand some dry running. One example of a reinforced fluoropolymer is Aramid reinforced Polytetrafluoroethylene (PTFE).

FIG. 1B is an axial cross section of a portion of an exemplary discharge head, indicated generally as 101, featuring a pre-lubrication port 160 according to some exemplary embodiments of the invention. Temporary reservoir 162 and narrow opening 164 are as described in FIG. 1A.

FIG. 1C is an axial cross section of a portion of a line shaft 130, indicated generally as 104, featuring pre-lubrication cups 134 according to some exemplary embodiments of the invention. Other numbers are as indicated above.

In some exemplary embodiments of the invention, oil is added to the apparatus via port 160 until all of cups 134 are full. The point at which all of cups 134 are full can be calculated as a required fill time or required lubricant volume. Alternatively or additionally, in some embodiments a feedback loop confirms that sufficient lubricant has been added.

Figure 1D:
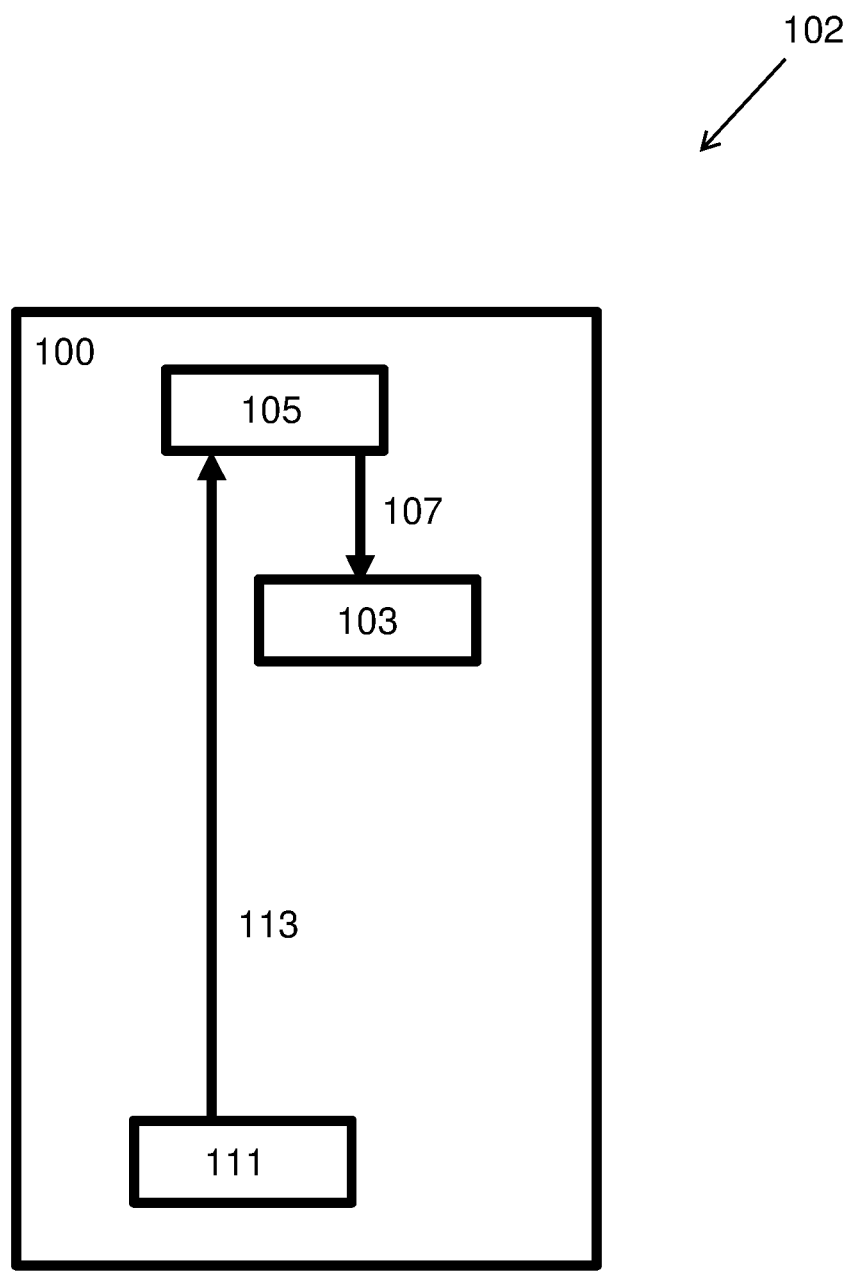
FIG. 1D is a schematic representation of a feedback loop suitable for switching the apparatus of FIG. 1A between two operational states according to some exemplary embodiments of the invention.

FIG. 1D is a schematic representation of a feedback loop, indicated generally as 102 suitable for switching the apparatus of FIG. 1A between two operational states according to some exemplary embodiments of the invention.

In some exemplary embodiments of the invention, apparatus 100 includes a lubricant sensor 111 installed at or below a bottom-most unsubmerged lubrication cup 134. In the depicted embodiment, sensor 111 provides an output signal 113 when in contact with lubricant. In some embodiments signal 113 indicates that sufficient lubrication fluid has been introduced into port 160 to "prime" the apparatus. In the depicted embodiment, signal 113 from sensor 111 is received by a controller 105. In response to signal 113, controller 105 provides an operation signal 107 which operates a motor 103. Motor 103 turns drive string rod 130. In the depicted embodiment, turning of drive string rod 130 is a response to output signal 113 from sensor 111 mediated by controller 105 and/or motor 103.

In some embodiments brine rising in inner cavity 142 of production tubing 140 is harvested via discharge pipe 120. Alternatively or additionally, in some embodiments brine rising in inner cavity 142 of production tubing 140 washes away oil from cups 134 and/or drive string rod 130.

Exemplary Method

Figure 2:
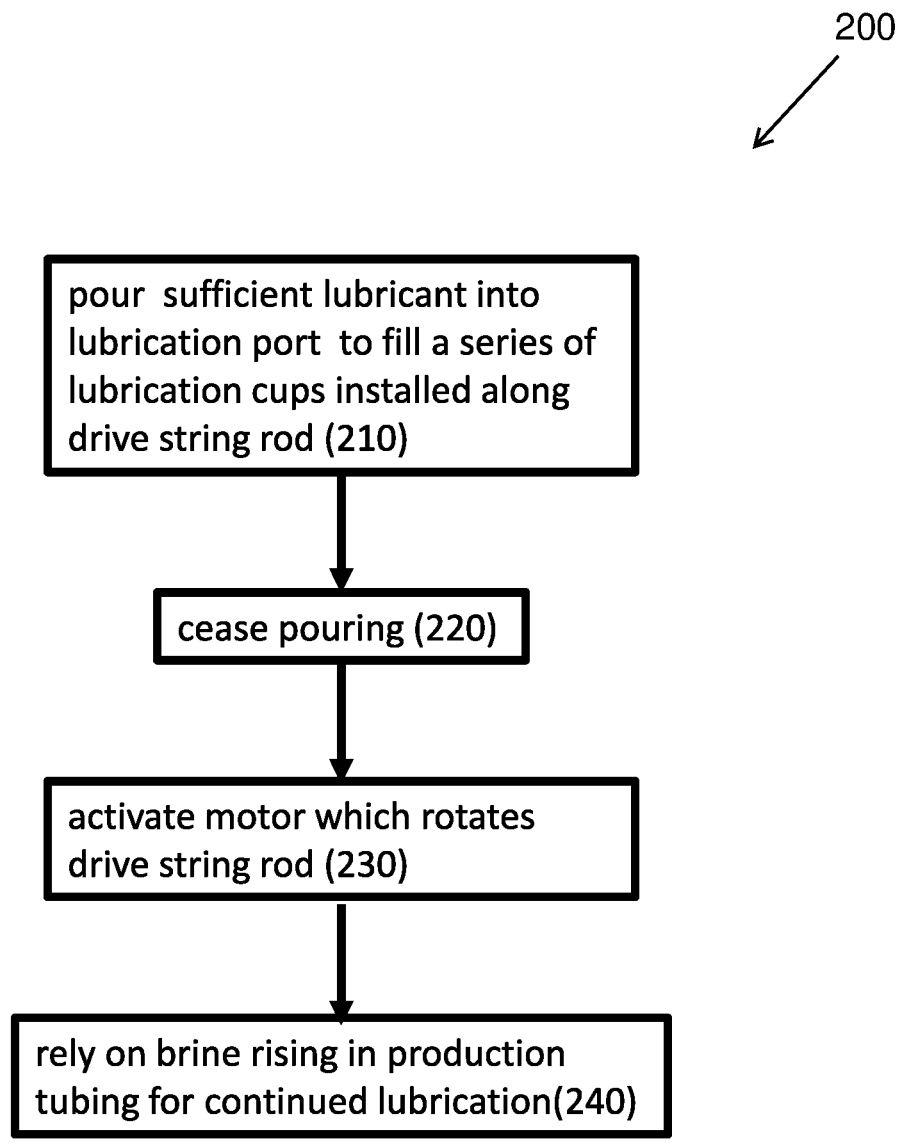
FIG. 2 is a simplified flow diagram of a method according to some exemplary embodiments of the invention.

FIG. 2 is a simplified flow diagram of a pre-lubrication method for a pumping apparatus, indicated generally as 200, according to some exemplary embodiments of the invention.

Depicted exemplary method 200 includes pouring 210 sufficient lubricant into a lubrication port of a well pumping apparatus to fill a series of lubrication cups installed along a drive string rod of the apparatus. In some exemplary embodiments of the invention, the lubricant amount and time needed for filling the cups are calculated in advance. In some embodiments method 200 includes ceasing 220 the pouring and activating 230 a motor which rotates the drive string rod. In some embodiments method 200 includes relying 240 on brine rising in production tubing for continued lubrication.

In some embodiments brine rising in the production tubing washes away oil used for pre-lubrication.

In some exemplary embodiments of the invention, addition of lubricant at 210 is ceased 220 just prior to activation 230 of the motor. In some embodiments it takes the brine less than a minute to fill the production tubing after activation 230.

In some embodiments ceasing 220 is in response to a signal from a lubricant sensor (111) installed at or below a bottom-most unsubmerged lubrication cup.

Additional Exemplary Method

Figure 3:
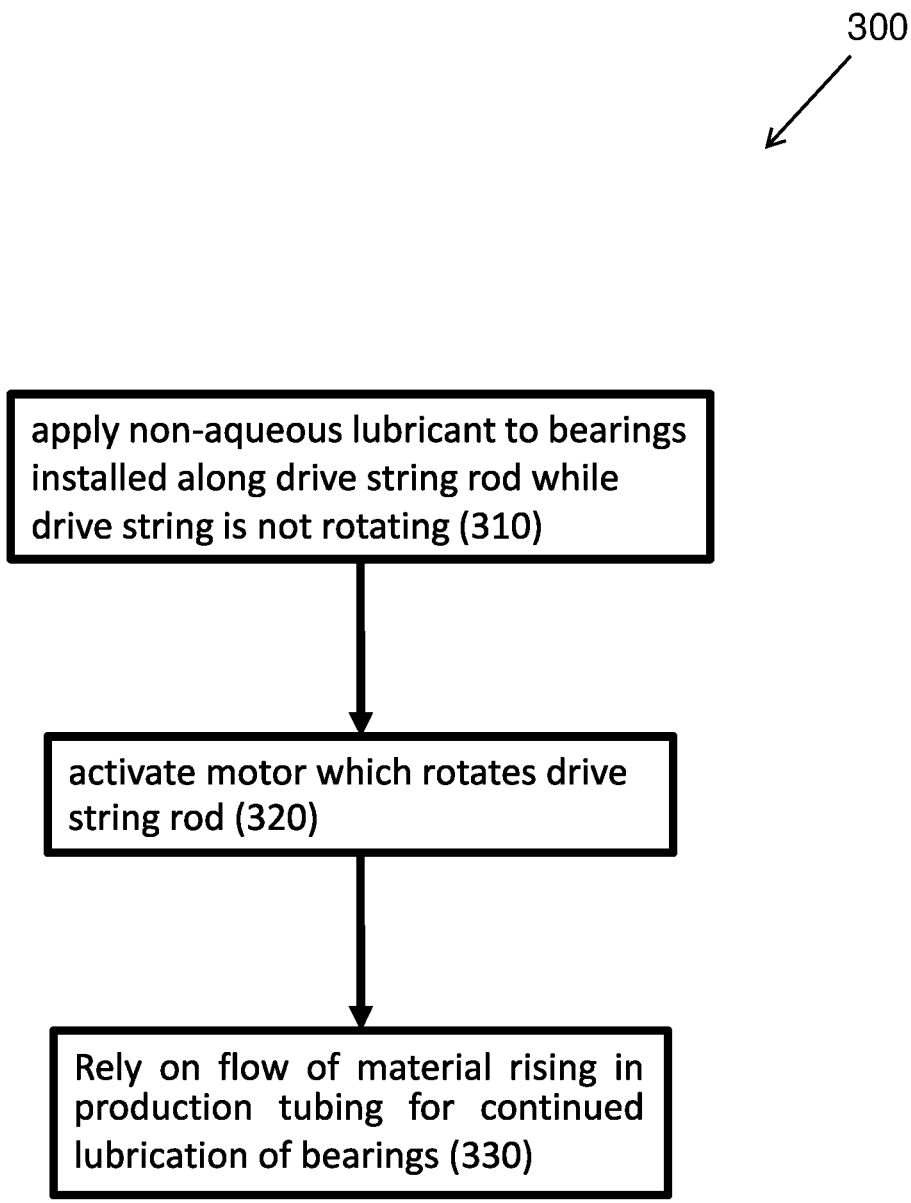
FIG. 3 is a simplified flow diagram of a method according to some exemplary embodiments of the invention.

FIG. 3 is a simplified flow diagram of a pre-lubrication method for a pumping apparatus, indicated generally as 300, according to some exemplary embodiments of the invention.

Depicted exemplary method 300 includes applying 310 a non-aqueous lubricant to bearings installed along a drive string rod of a well pumping apparatus while said drive string is not rotating. In some exemplary embodiments of the invention, the bearings comprise fluoropolymer and/or reinforced fluoropolymer. Once sufficient non-aqueous lubricant has been applied, a motor which rotates said drive string rod is activated 320. According to various exemplary embodiments of the invention activation 320 is manual, or implemented automatically in response to a sensor output as described hereinabove.

In the depicted embodiment, method 300 includes relying 330 on a flow of material rising in the production tubing for continued lubrication of the bearings. In some embodiments a rising flow of material in the production tube washes away the non-aqueous lubricant. In some embodiments the material rising in the production tubing contains water. In some embodiments the material rising in the production tubing includes geothermal brine.

Additional Exemplary Apparatus Referring again to FIG. 1A, some embodiments of the invention relate to a well pumping apparatus including a discharge head 110, a drive string rod 130 in fluid communication with an inner cavity 142 of a production tubing 140 and sets of bearings 150 comprising fluoropolymer distributed along a length of said drive string rod. In some embodiments the fluoropolymer is reinforced, for example with aramid.

In the depicted embodiment, the apparatus includes a pre-lubrication port 160 at discharge head 110 and lubrication cups 134 installed along drive string rod 130 adjacent to the sets of bearings.

In the depicted embodiment, the apparatus includes drive string rod couplings 132 between sections of drive string rod 130.

In the depicted embodiment, the apparatus includes production tubing couplings 144 with bearing supports 152 between sections of production tubing 140.

Referring now to FIG. 1D, in some embodiments the apparatus includes a lubricant sensor 111 installed at or below a bottom-most lubrication cup, said sensor providing an output signal 113 when in contact with lubricant. In some embodiments the apparatus includes a controller 105 which operates a motor 103 to turn drive string rod 130 in response to the output signal from sensor 111.

Exemplary Non Aqueous Lubricant Considerations

In some exemplary embodiments of the invention, edible oils are used for pre-lubrication. In some embodiments use of edible oils contributes to a reduction in problems associated with decontaminating the brine.

Alternatively or additionally, in some embodiments low viscosity oils such as ISO VG32 are employed.

It is expected that during the life of this patent many drive string rod types and/or bearing types will be developed and the scope of the invention is intended to include all such new technologies a priori.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

Specifically, a variety of numerical indicators have been utilized. It should be understood that these numerical indicators could vary even further based upon a variety of engineering principles, materials, intended use and designs incorporated into the various embodiments of the invention. Additionally, components and/or actions ascribed to exemplary embodiments of the invention and depicted as a single unit may be divided into subunits. Conversely, components and/or actions ascribed to exemplary embodiments of the invention and depicted as sub-units/individual actions may be combined into a single unit/action with the described/depicted function.

Alternatively, or additionally, features used to describe a method can be used to characterize an apparatus and features used to describe an apparatus can be used to characterize a method.

It should be further understood that the individual features described hereinabove can be combined in all possible combinations and sub-combinations to produce additional embodiments of the invention. The examples given above are exemplary in nature and are not intended to limit the scope of the invention which is defined solely by the following claims.

Each recitation of an embodiment of the invention that includes a specific feature, part, component, module or process is an explicit statement that additional embodiments of the invention not including the recited feature, part, component, module or process exist.

Alternatively or additionally, various exemplary embodiments of the invention exclude any specific feature, part, component, module, process or element which is not specifically disclosed herein.

Specifically, the invention has been described in the context of geothermal wells but might also be used in the context of wells for brackish water or sweet water.

All publications, references, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The terms "include", and "have" and their conjugates as used herein mean "including but not necessarily limited to".

The invention claimed is:

1. A well pumping apparatus comprising:
   (a) a discharge head (110);
   (b) a drive string rod (130) in fluid communication with an inner cavity (142) of a production tubing (140);
   (c) a pre-lubrication port (160) at said discharge head; and
   (d) lubrication cups (134) installed along said drive string rod adjacent to sets of bearings (150) distributed along the drive string rod.

2. A well pumping apparatus according to claim 1, comprising drive string rod couplings (132) between sections of said drive string rod.

3. A well pumping apparatus according to claim 1, comprising production tubing couplings (144) with bearing supports (152) between sections of said production tubing.

4. A well pumping apparatus according to claim 1, wherein said bearings comprise non-metallic bearings.

5. A well pumping apparatus according to claim 4, wherein said non-metallic bearings comprise fluoropolymer.

6. A well pumping apparatus according to claim 5, wherein said fluoropolymer is reinforced.

7. A well pumping apparatus according to claim 1, comprising a lubricant sensor (111) installed at or below a bottom-most unsubmerged lubrication cup, said sensor providing an output signal (113) when in contact with lubricant.

8. A well pumping apparatus according to claim 7, comprising a controller (105) which operates a motor (103) to turn said drive string rod in response to said output signal from said sensor.

9. A method comprising:
   (a) applying (310) a non-aqueous lubricant to bearings installed along a drive string rod of a well pumping apparatus while said drive string is not rotating;
   (b) activating (320) a motor which rotates said drive string rod; and
   (c) relying (330) on a flow of material rising in a production tubing of said well pumping apparatus for continued lubrication of said bearings.

10. A method according to claim 9, wherein said material rising in said production tubing comprises water.

11. A method according to claim 9, wherein said non-aqueous lubricant comprises an edible oil.

12. A method according to claim 9, wherein said bearings comprise fluoropolymer.

13. A method according to claim 12, wherein said fluoropolymer is reinforced.

* * * * *